UNITED STATES PATENT OFFICE.

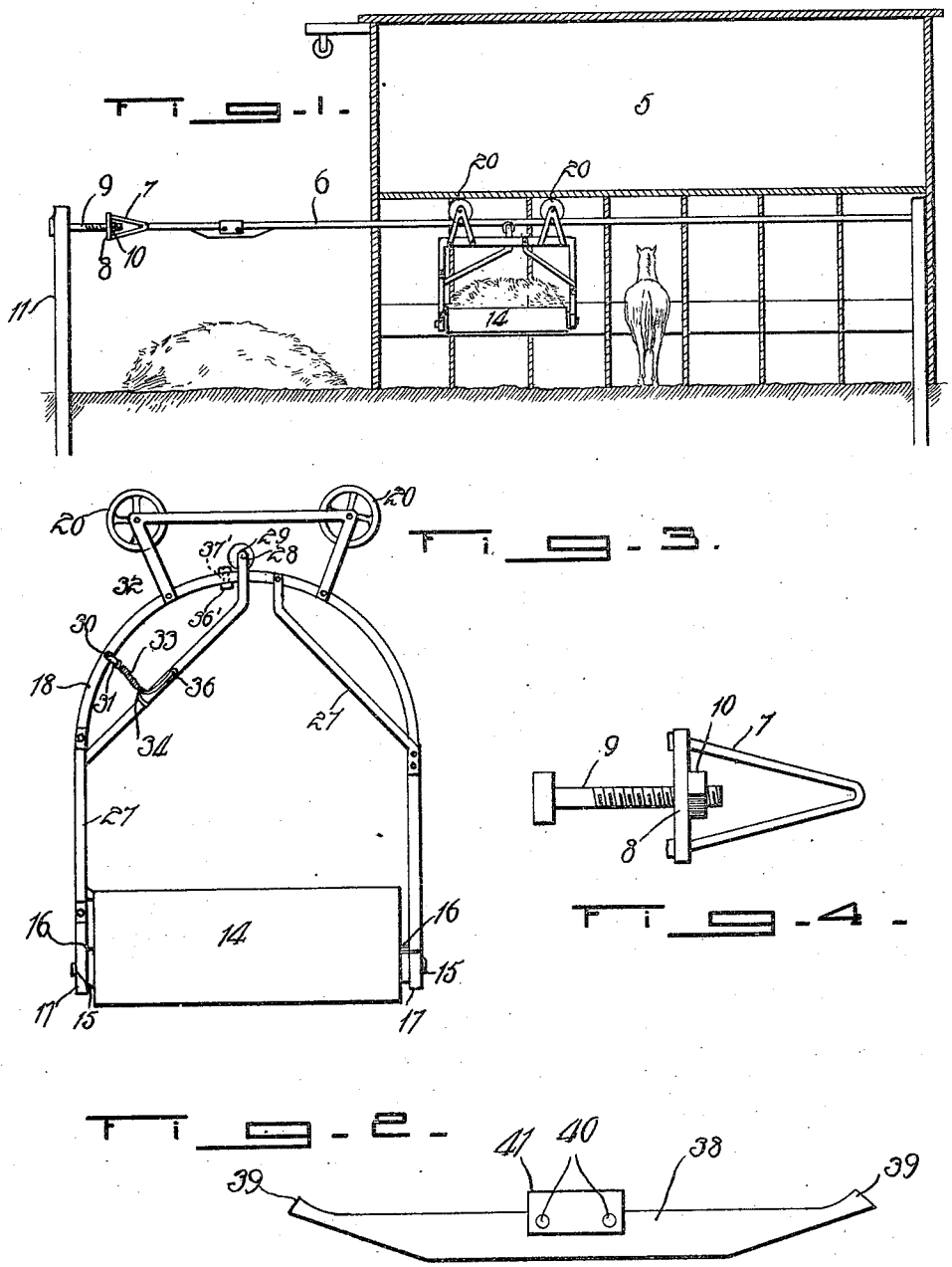

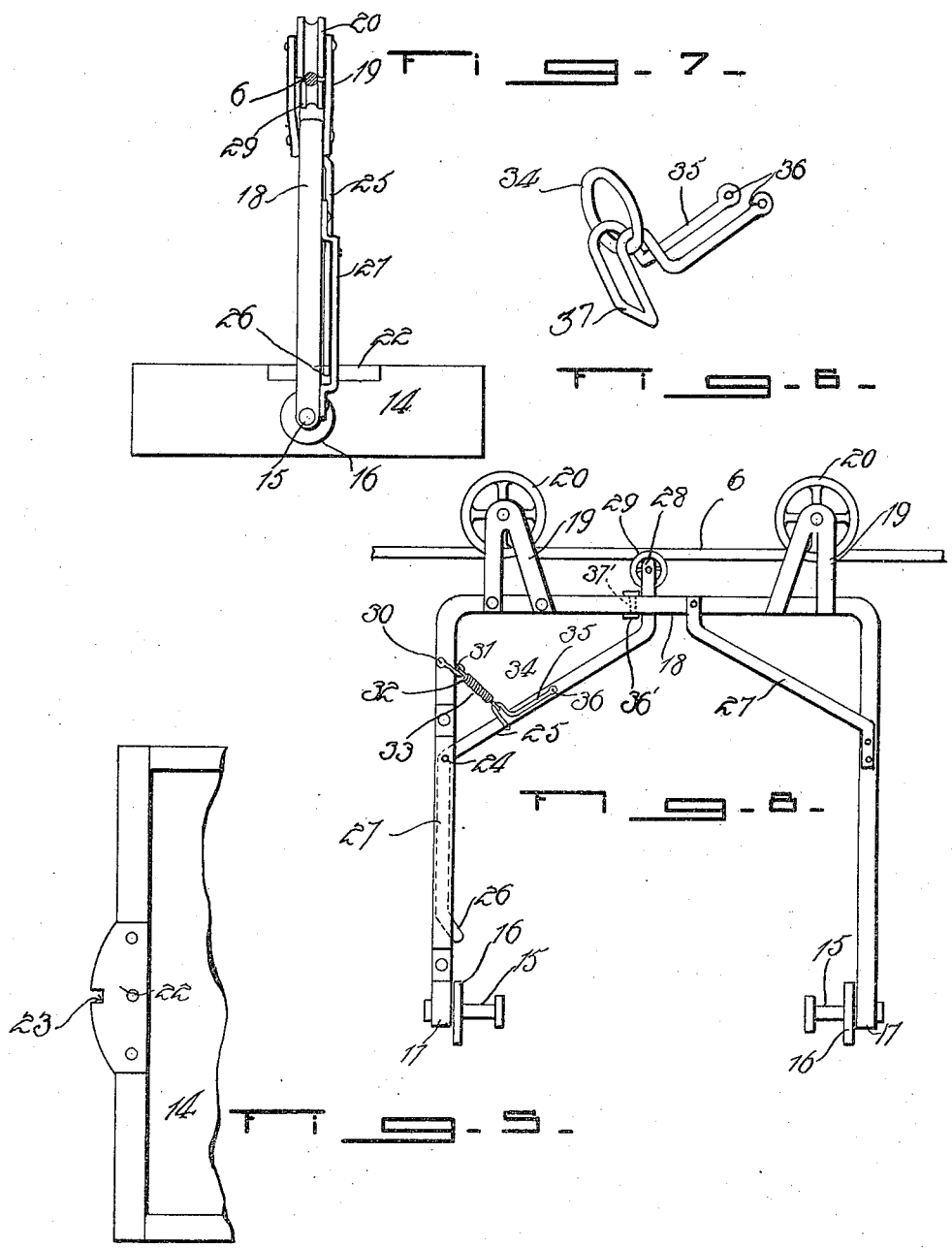

CANUTE C. LAWSON, OF SKYBERG, MINNESOTA.

LITTER-CARRIER.

933,994.   Specification of Letters Patent.   Patented Sept. 14, 1909.

Application filed March 25, 1909. Serial No. 485,737.

*To all whom it may concern:*

Be it known that I, CANUTE C. LAWSON, a citizen of the United States, residing at Skyberg, in the county of Goodhue and State of Minnesota, have invented certain new and useful Improvements in Litter-Carriers, of which the following is a specification.

This invention relates to certain new and useful improvements in litter carriers.

The object of my invention is, to provide a light, simply constructed and readily operated carrier, arranged to be used in conveying manure, and like litter from a barn, sty, or other building, used in housing live stock, so that the litter may be conveniently transported upon an aerial tramway, to a suitable dumping point, where the bucket or carrier will be automatically dumped.

With these and other objects in view, the present invention consists in the combination and arrangement of parts, as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 is an elevational view of a barn equipped with my improved carrier. Fig. 2 shows an enlarged detached detail of the trip as used in my invention. Fig. 3 shows an enlarged detached detail of a modification of my carrier frame. Fig. 4 shows an enlarged detached detail of the tension adjuster. Fig. 5 is a broken detached view of the bucket disclosing the plate arranged to receive the lower end of the pivoted trolley arm as used in my invention. Fig. 6 is a perspective view of the yoke receiving the spring holding the trolley arm. Fig. 7 shows an end view of my carrier.

In the care of live stock, such as cattle, horses, hogs, and poultry, it is quite necessary in order to keep the animals in good health that the housing quarters be kept in a sanitary condition. In my present invention, I provide a light portable, readily operated carrier, constructed so that the litter may be conveniently transported from the stabling point, to a suitable dumping point.

In the accompanying drawings, 5 shows a barn equipped with my self dumping carrier. The support for the carrier comprises an aerial tramway, which in the building may comprise a stiff supporting rail, but which outside of the building is in the form of a cable 6. This cable is secured to a tension device comprising the yoke 7, having its end held within the plate 8, which is carried upon the bolt 9, the yoke being adjusted by means of a nut 10. The bolt 9 is held within a suitable terminal supporting post as the one marked 11 and disclosed in Fig. 1. The cable by means of this tension device may at all times be held substantially taut.

The bucket or carrier, comprises a preferably sheet metal receptacle 14, of any suitable capacity, provided near its opposite lower edges with the pivot bolts 15, which pass entirely through the bucket. These bolts carry the disk 16, and are secured within the sleeve end 17 of the carrier frame 18. This frame may be in the form of a three sided member, or be curved if desired. Near its upper end the carrier frame has secured to it the brackets 19, 19 carrying the cable sheaves 20, arranged to run upon the cable 6. The frame is strengthened by means of a corner brace 21, as shown. The bucket or carrier 14, near one end is provided with the plate 22, having the slot 23 as disclosed in Fig. 5. The carrier frame 18 upon the side opposite the brace 21 is provided with the pivot bolt 24 which pivotally supports the trolley arm 25 as disclosed in Fig. 8. This trolley arm 25 has its lower end extending outward to form a keeper 26 which is arranged to work into the slot 23 of the receptacle 14. In order to properly hold the lower end of the trolley arm 25, I employ the bar 27 which forms a bracket so that the keeper or detent 26 is held between this bracket 27 and the frame member 18. The upper end of the trolley arm 25, extends beyond the upper end of the carrier frame 18 and is provided with a pin 28 revolubly supporting the grooved wheel 29 arranged to work against the under surface of the supporting cable 6.

At a suitable point above the pivot pin 24 the carrier frame 18 is provided with the bolt 30, carrying the shackle 31 to which is secured a split ring 32, this split ring receiving the end of a retractile coil spring 33, the lower or opposite end 34 of this spring being hooked to the upper looped end of the yoke 35 as clearly disclosed in Fig. 8. This yoke 35 is secured to the trolley arm by means of the bolt 36. In Fig. 6 I have disclosed a perspective view of this yoke and the under portion 37 of this yoke is arranged to rest upon the under edge of the trolley arm 25. By means of this spring 33, the trolley wheel 29 is normally brought into engagement with the supporting cable 6. The frame 18 near its upper end and adjacent to the trolley arm, is provided with stop ear 36' arranged so that in case the trolley should jump off the cable, it will strike this stop ear and be held by the same. This stop ear is secured by means of the bolt 37'. The instrumentalities are so arranged that in its normal condition the trolley arm 25 will have its trolley wheel 29 riding against the cable 6 while the lower keeper end 26 will be held within the bucket slot 23.

Secured to the cable 6 is a trip in the form of a bar 38 having the flaring terminal ears 39 and arranged to stride the cable 6. The trip 38 carries the two screws 40 and these screws in turn support the clamping bars 41 which are slightly curved so as to clamp about the cable 6. The trip 38 is adjustably secured with the cable 6 by means of these clamping bars 41, so that the trip may be located at any desired point on the cable.

The operation of my device is very simple. The bucket having been loaded is shifted along the aerial tramway until the trolley wheel 29 encounters the trip 38. As the trolley wheel 29 rides upon the trip 38, the ends of which are beveled to insure the trolley wheel being guided upon the trip, the trolley arm 25 is tipped so that the keeper 26 is carried out of the slot 23. Pivotally secured at its lower end as soon as the keeper is being carried out of the slot 23 the bucket automatically dumps.

The device is light, simple of construction, and positive in its operation.

And having thus described my said invention what I claim as new and desire to secure by United States Letters Patent is:—

The herein described conveyer, comprising a supporting cable, a trip adjustably secured to said cable, a carrier frame, supporting sheaves secured to said frame, and traveling upon said cable, a bucket pivotally secured to said carrier frame, said bucket having a receiving slot, a trolley arm pivotally secured to said carrier frame having its lower end arranged for engagement within said slot, a trolley wheel secured to the upper end of said arm and working against said cable, a yoke secured to said trolley arm, and a spring secured to said carrier frame and said yoke.

In testimony whereof I affix my signature, in presence of two witnesses.

CANUTE C. LAWSON.

Witnesses:
L. H. LAWSON,
E. O. BEEKKE.